United States Patent [19]
Donelan

[11] 3,735,616
[45] May 29, 1973

[54] METHOD OF AND APPARATUS FOR CORRUGATING TUBING

[75] Inventor: James Arthur Francis Donelan, Alresford, England

[73] Assignee: Pirelli General Cable Works Limited, London, England

[22] Filed: Oct. 19, 1970

[21] Appl. No.: 82,048

[30] Foreign Application Priority Data

Nov. 27, 1969 Great Britain.....................58,100/69

[52] U.S. Cl...................................................72/77
[51] Int. Cl. ............................................B21d 13/00
[58] Field of Search............................72/77, 78, 465

[56] References Cited

UNITED STATES PATENTS

| | | |
|---|---|---|
| 3,451,242 | 6/1969 | Tobia.......................................72/77 |
| 3,570,297 | 3/1971 | Matthews...............................72/276 |
| 3,243,985 | 4/1966 | Green....................................72/260 |
| 3,359,835 | 12/1967 | McDowell..........................76/107 R |
| 3,461,702 | 8/1969 | Wallace et al..........................72/161 |
| 3,572,074 | 3/1971 | Holdup et al............................72/77 |

FOREIGN PATENTS OR APPLICATIONS 990,321    4/1965   Great Britain..........................72/77

Primary Examiner—Richard J. Herbst
Attorney—Holcombe, Wetherill & Brisebois

[57] ABSTRACT

In an apparatus for corrugating metal tubing, such as an electric cable sheath, the working ridge which bears against the tubing to corrugate the tubing is of a material having a modulus of elasticity lower than that of the tubing-metal. Both the material of the working ridge and the material of bushes positioned either side of the corrugating ridge to support and locate the tubing as it is moved axially through the apparatus are of low friction.

5 Claims, 2 Drawing Figures

METHOD OF AND APPARATUS FOR CORRUGATING TUBING

BACKGROUND OF THE INVENTION

This invention relates to an apparatus for corrugating metal tubing and is particularly, but not exclusively, applicable to metal tubing which constitutes the sheath of an electric cable.

PRIOR ART

For producing helical corrugations in metal tubing, it has been proposed to use an annular corrugating member surrounding the tubing eccentrically so that a circular working ridge on the inner circumference of the annular corrugating member bears against the tubing, and to move the annular corrugating member such that its geometric center follows a circular path around the axis of the tubing whilst passing the tubing through the corrugating member. The required movement of the corrugating member is provided by rotating about the axis of the tubing a head in which the corrugating member is mounted. The corrugating member is mounted in the head so as to be freely rotatable in its own plane about its geometric center. The plane of the working ridge is inclined to the plane perpendicular to the axis of the tubing so that, at the point of contact between the working ridge and the tubing, the working ridge lies parallel to the line of the corrugation. The tubing is supported by means of two bushes, one placed on either side of the corrugating member. Such an arrangement is disclosed in our British Pat. No. 791,513.

For producing annular corrugations in metal tubing, it has been proposed to use an annular corrugating member surrounding the tubing eccentrically so that a helical working ridge on the inner circumference of the annular corrugating member bears against the tubing, and to move the annular corrugating member so that its geometric center follows a circular path around the axis of the tubing whilst the tubing is moved through the corrugating member. The required movement of the corrugating member is provided, as in the previously described arrangement, by rotating a head in which the corrugating member is mounted, about the axis of the tubing. The corrugating member is mounted in the head so as to be freely rotatable about the longitudinal axis of the helix of the working ridge. The tubing is supported by means of two bushes, one placed on either side of the corrugating member.

When corrugating tubing such as cable sheaths, of metal, such as aluminum, by either of the arrangements outlined above, the metal of the tubing is subjected to stresses resulting from being bent to form the corrugations and to stresses resulting from the drawing or feeding of the tubing or cable through the corrugating member. These latter stresses vary with the weight of the tubing or cable and with the forces applied to the tubing or cable for drawing or feeding purposes. The combination of these stresses can result in unwanted plastic flow of the metal, particularly in the roots and flanks of the corrugations, especially when the corrugating member is of hard metal. The work-hardening associated with such plastic flow may substantially impair the fatigue properties of the tubing. This is a particular problem in the case of cable sheaths where the cable is subjected to cyclic flexing resulting from temperature changes, as occur when the cable is used for switching heavy load currents.

An object of the present invention is to provide an apparatus for corrugating metal tubing wherein unwanted plastic flow of the metal of the tubing, particularly in the roots and flanks of the corrugations, is substantially reduced or eliminated.

A further problem which arises in the known apparatuses previously described is that it is necessary to apply lubricant between the tubing on the one hand and the metal annular corrugating member and the metal support bushes on the other hand in order to reduce the frictional loading on the tubing and to avoid metal-to-metal pick-up. Unless the type and the quantity of the lubricant used are correctly controlled, residues of the lubricant may remain on the tubing as it leaves the corrugating apparatus and may then interfere with subsequent processing of the tubing such as, in the case of cable sheaths, the application of bituminous materials to form a corrosion protective sheath.

It is therefore a subsidiary object of the present invention to provide an apparatus for corrugating metal tubing in which it is unecessary to apply lubricant between the tubing on the one hand and the annular corrugating member and support bushes on the other hand.

SUMMARY OF THE INVENTION

The present invention provides apparatus for corrugating metal tubing comprising means for supporting the tubing whilst permitting its axial movement, an annular corrugating member mounted so as to encircle the tubing eccentrically with a working ridge on the inner circumference of the annular corrugating member bearing against the external surface of the tubing whereby to corrugate the tubing and means for moving the annular corrugating member so that its geometric center follows a circular path around the longitudinal axis of the tubing, at least the working ridge of the annular corrugating member being of a material having a modulus of elasticity lower than the modulus of elasticity of the metal of the tubing.

Preferably, the means for supporting the tubing includes a pair of bushes of low-friction material arranged one either side of the annular corrugating member to encircle and thus support the tubing and the material of which at least the working ridge of the annular corrugating member is made is of low-friction. Lubricant is then unnecessary.

DESCRIPTION OF THE DRAWINGS

Other features and advantages of the invention will appear from the following description of an embodiment thereof given by way of example with reference to the accompanying drawings, in which.

Figure 1:
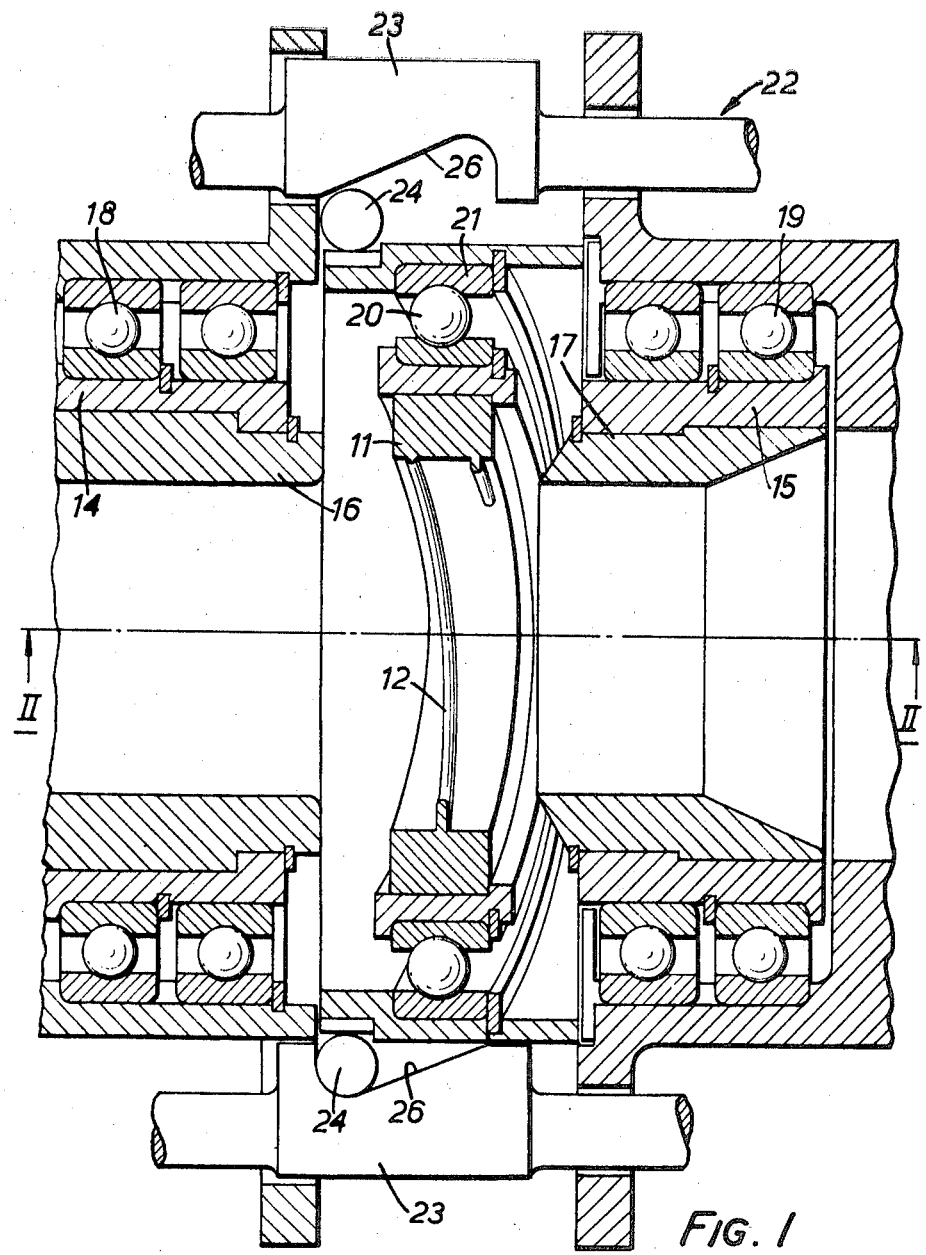
FIG. 1 is a cross-sectional view of part of an apparatus for corrugating metal tubing, taken along the longitudinal axis of the tubing to be corrugated.
Figure 2:
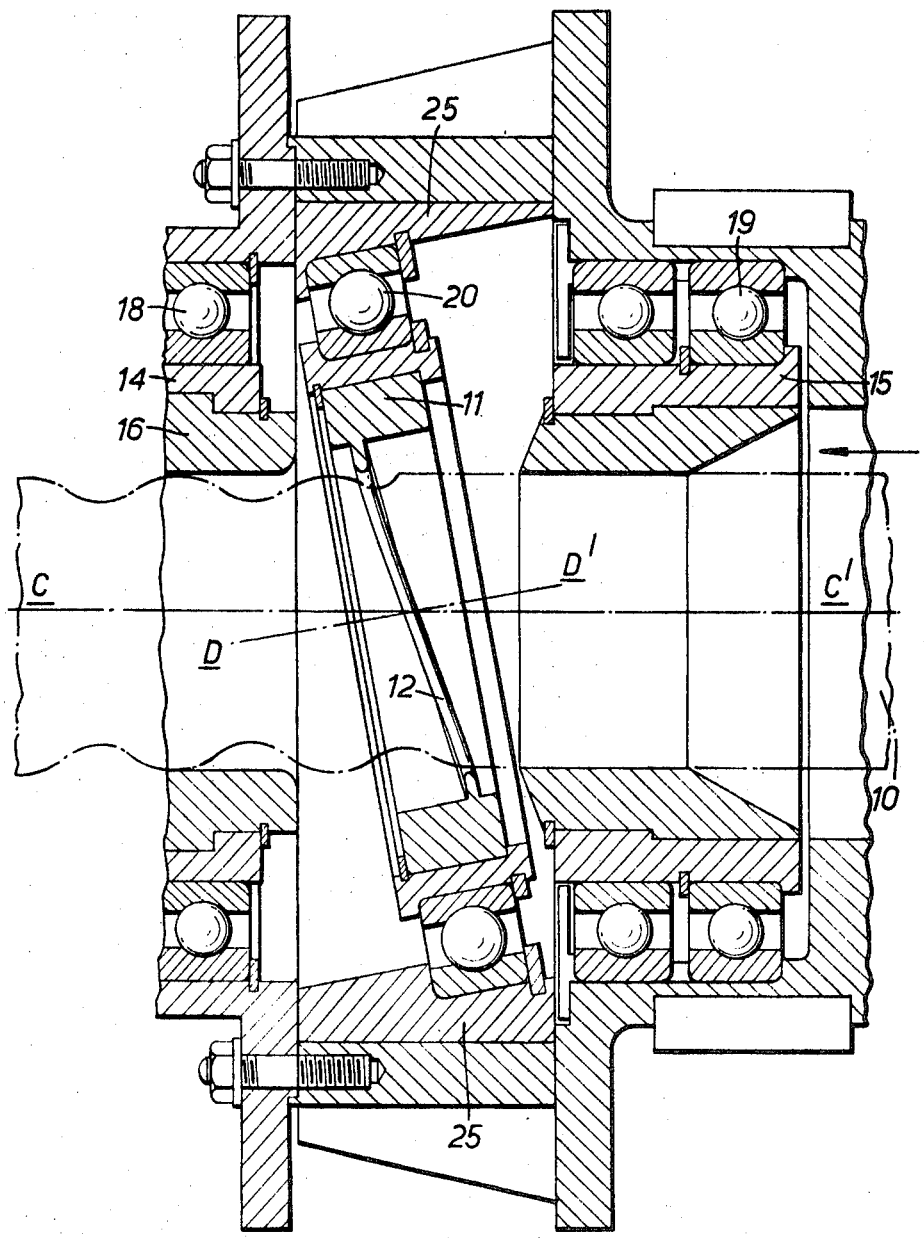
FIG. 2 is a cross-sectional view of the apparatus of FIG. 1, along the line II—II of FIG. 1.

Referring to the drawings, there is shown an apparatus, similar to that described in the complete specification of cognated applications Nos. 1266/68 and 35552/68, for forming annular corrugations in metal tubing 10 (FIG. 2), such as the metal sheath of an electric cable. The apparatus comprises an annular corrugating member 11 encircling the tubing 10 eccentrically so that a helical working ridge 12 on the inner circumference of the annular corrugating member 11 bears against the external surface of the tubing 10, whereby to corrugate the tubing. Two cylindrical bushes 16, 17, formed as inserts in respective sleeves 14, 15 and positioned one on either side of the corrugating member 11, serve to support tubing 10 and maintain its axis C—C' on the correct line relative to the corrugating member 11, whilst permitting axial movement of tubing 10. A head 22 is journalled on sleeves 14, 15 by means of ball-races 18, 19 so as to be rotatable about the axis of the tubing 10 and a carrier 21 is mounted within head 22 so as to be rotatable with head 22. The annular corrugating member 11 is mounted within carrier 21 through the agency of a ball-race 20. As can be seen in FIG. 2, the axis D—D' of the helix of the working ridge 12 is inclined to the axis C—C' of the tubing 10 by an angle at least equal to the pitch angle of the helical working ridge 12. The purpose of this inclination will be explained later.

An arrangement is provided for adjusting the eccentricity of the axis of the corrugating member 11 relative to the axis of the tubing 10, to thereby adjust the depth of the corrugations formed in tubing 10. Thus the head 22 carries two diametrically opposed cam members 23 which have parallel cam surfaces 26 inclined to the axis C—C' of the tubing 10. Cam members 23 are movable together parallel to the axis C—C' of the tubing 10 to effect radial adjustment of the carrier 21 through cam follower rollers 24 which are captive on an outer cylindrical track on the carrier 21. For axial movement of cam members 23, the cam members are attached to a block (now shown) which rotates with the head 22 and which is connected through a suitable bearing to a nonrotating sleeve movable parallel to the axis C—C' of the tubing, even when the head 22 is rotating, to adjust the axial position of the cam members 23. This arrangement for adjusting the eccentricity of the corrugating member 11 is similar to that described in our Patent Specification No. 1,097,709.

Upon rotation of the head 22, the annular corrugating member 11 moves so that its geometric center (which lies on the axis of the working ridge 12) follows a circular path around the axis C—C' of the tubing 10, and the working ridge 12 bears against and thereby corrugates the tubing 10. The friction between the working ridge 12 and tubing 10 causes the annular corrugating member 11 to rotate within its ball-race 20. Provided the tubing 10 moves axially at the correct rate relative to the rate of rotation of corrugating member 11, the corrugations will be of annular form. In the apparatus shown, the axis of the working ridge 12 is so inclined to the axis C—C' of the tubing 10 that upon rotation of head 22, axial movement of the tubing 10 is induced, the rate of axial movement being at the required rate relative to the rate of rotation of head 22 for forming annular corrugations. For this drive to be achieved, it is necessary for the angle of inclination of the axis D—D' to the axis C—C' to be equal to or greater than the pitch angle of the helical working ridge 12.

In accordance with the present invention, at least the working ridge 12, and possibly the whole, of the annular corrugating member 11 is made of material having a lower modulus of elasticity than the metal of the tubing 10. The working ridge 12 will then yield elastically before plastic flow of the metal of the tubing 10 can occur. The working ridge 12 must of course be sufficiently stiff to bend the wall of the tubing 10 and must have sufficient compressive strength to avoid being damaged itself.

Preferably, the material of which at least the working ridge 12 and possibly the whole of the annular corrugating member 11 is made, is of low-friction and also the material of which support bushes 16, 17 are made is of low-friction, whereby it is unnecessary to apply lubricant between the tubing 10 on the one hand and the annular corrugating member 11 and support bushes 16, 17 on the other hand.

Suitable materials from which at least the working ridge 12 and possible the whole of the annular corrugating member 11 may be made are plastics material, such as a polyamide (e.g. nylon) or acetyl resin, reinforced or bonded plastics, and hard natural or synthetic rubber. Such materials may be bonded on to a hard metal substrate to provide sufficient strength.

In particular, for corrugating aluminum tubing, nylon is a suitable material. Typically, nylon has a modulus of elasticity of the order of $0.25 \times 10^6$ p.s.i., whereas aluminum of 99.8 percent commercial purity has an elastic modulus of the order of $9.9 \times 10^6$ p.s.i.

Suitable materials from which the support bushes 16, 17 may be made are plastics material (e.g. a polyamide or acetyl resin), reinforced or bonded plastics, or hard natural or synthetic rubber, and these materials may be bonded to hard metal substrates.

The above-described apparatus may be modified for the formation of helical corrugations, instead of annular corrugations, in the tubing or cable sheath 10, by providing the annular corrugating member 11 with a working ridge 12 of circular rather than helical form. In such modified apparatus, the annular corrugating member 11 is inclined in the same manner as is shown in FIG. 2 such that, at the point of contact between the working ridge 12 and the tubing, the working ridge lies generally parallel to the line of the corrugation.

I claim:

1. Apparatus for corrugating metal tubing comprising means for supporting the tubing against radial movement whilst permitting its axial movement, an annular corrugating member, a free-standing self-sustaining working ridge on the inner circumference of the annular corrugating member, mounting means for mounting the annular corrugating member so that the annular corrugating member encircles the tubing eccentrically with the working ridge bearing against the external surface of the tubing whereby to corrugate the tubing, and means for moving the annular corrugating member so that its geometric center follows a circular path around the tubing axis as the tubing moves through the corrugating member, at least the working ridge of the corrugating member being of a material having a modulus of elasticity lower than the modulus of elasticity of the metal of the tubing.

2. Apparatus as claimed in claim 1 in which the material of which at least the working ridge is made comprises plastics material.

3. Apparatus as claimed in claim 2 in which said plastics material is nylon.

4. Apparatus as claimed in claim 1 in which the material of which at least the working ridge is made is hard rubber.

5. A method of corrugating metal tubing which comprises the steps of supporting the tubing against radial movement while displacing the tubing axially through an annular corrugating member which encircles the tubing eccentrically, which member has a free-standing internal ridge bearing against the tubing and made of a material having a modulus of elasticity lower than that of the metal of the tubing, and driving the annular corrugating member so that its geometric center follows a circular path around the axis of the tubing.

* * * * *